(12) United States Patent
Koch et al.

(10) Patent No.: US 8,867,381 B2
(45) Date of Patent: Oct. 21, 2014

(54) ACTIVE MULTI-PATH NETWORK REDUNDANCY WITH PERFORMANCE MONITORING

(75) Inventors: Rolland Mitchell Koch, Pasadena, CA (US); William Stuart Sechrist, Simi Valley, CA (US); Daniel Bailey Hiranandani, Santa Barbara, CA (US)

(73) Assignee: AeroVironment, Inc., Monrovia, CA (US)

( * ) Notice: Subject to any disclaimer, the term of this patent is extended or adjusted under 35 U.S.C. 154(b) by 562 days.

(21) Appl. No.: 12/889,293

(22) Filed: Sep. 23, 2010

(65) Prior Publication Data

US 2011/0096682 A1      Apr. 28, 2011

Related U.S. Application Data

(60) Provisional application No. 61/245,170, filed on Sep. 23, 2009, provisional application No. 61/319,363, filed on Mar. 31, 2010.

(51) Int. Cl.
| | |
|---|---|
| *H04L 12/26* | (2006.01) |
| *H04L 1/02* | (2006.01) |
| *H04L 1/08* | (2006.01) |
| *H04L 29/06* | (2006.01) |
| *H04L 29/08* | (2006.01) |

(52) U.S. Cl.
CPC ............... *H04L 1/02* (2013.01); *H04L 43/106* (2013.01); *H04L 69/14* (2013.01); *H04L 1/08* (2013.01); *H04L 67/12* (2013.01); *H04L 43/0835* (2013.01); *H04L 69/32* (2013.01)
USPC ........... 370/252; 370/360; 370/389; 370/390; 370/394

(58) Field of Classification Search
USPC .......................................... 370/220–253, 328
See application file for complete search history.

(56) References Cited

U.S. PATENT DOCUMENTS

| | | | |
|---|---|---|---|
| 5,918,019 A | 6/1999 | Valencia | |
| 6,356,545 B1 * | 3/2002 | Vargo et al. | 370/355 |
| 6,697,329 B1 * | 2/2004 | McAllister et al. | 370/235 |
| 7,272,681 B2 * | 9/2007 | Davies | 710/311 |

(Continued)

OTHER PUBLICATIONS

International Search Report for Serial No. PCT/US2010/050051 dated Nov. 23, 2010

(Continued)

*Primary Examiner* — Edan Orgad
*Assistant Examiner* — Emmanuel Maglo
(74) *Attorney, Agent, or Firm* — Brooks Acordia IP Law, P.C.; Eric Aagaard

(57) ABSTRACT

A receiving network node (210) configured to select from received packets differing by time of initial transmission from a sending network node (230), and accepting for transmission, based on initial transmission time, the selected packets to an application layer (740). An internetworked processor node configured to: (a) read a sequence number and an originator identifier of a received packet message (810); (b) compare a stored highest sequence number associated with the originator identifier with the received packet sequence number (820); (c) if the received packet sequence number is less than or equal to the stored highest sequence number associated with the originator identifier, then discard (840) the received packet; and (d) if the received packet sequence number is greater than the stored highest sequence number associated with the originator identifier, then deliver (860) the message of the received packet to an application based on an upper layer protocol.

11 Claims, 10 Drawing Sheets

(56) References Cited

U.S. PATENT DOCUMENTS

| | | | |
|---|---|---|---|
| 7,567,547 B2* | 7/2009 | Mosko et al. | 370/351 |
| 7,570,628 B2* | 8/2009 | Rangarajan et al. | 370/351 |
| 7,606,187 B2* | 10/2009 | Zeng et al. | 370/312 |
| 7,657,641 B2* | 2/2010 | Kang et al. | 709/230 |
| 7,814,535 B1* | 10/2010 | Barile et al. | 726/5 |
| 7,817,668 B2* | 10/2010 | Igarashi et al. | 370/474 |
| 8,170,022 B2* | 5/2012 | Tychon et al. | 370/392 |
| 8,295,162 B2* | 10/2012 | Soon et al. | 370/225 |
| 8,457,012 B2* | 6/2013 | Endo et al. | 370/253 |
| 8,458,462 B1* | 6/2013 | Hanna | 713/163 |
| 2002/0172148 A1* | 11/2002 | Kim et al. | 370/216 |
| 2004/0117498 A1* | 6/2004 | Hashimoto et al. | 709/230 |
| 2004/0143680 A1 | 7/2004 | Latvala | |
| 2005/0172024 A1* | 8/2005 | Cheifot et al. | 709/225 |
| 2005/0175009 A1* | 8/2005 | Bauer | 370/390 |
| 2006/0050649 A1* | 3/2006 | Botton-Dascal et al. | 370/252 |
| 2006/0171301 A1 | 8/2006 | Casper et al. | |
| 2007/0097892 A1* | 5/2007 | Tsang | 370/310 |
| 2007/0268832 A1* | 11/2007 | Soon et al. | 370/238 |
| 2008/0117896 A1* | 5/2008 | Romero et al. | 370/389 |
| 2008/0259788 A1* | 10/2008 | Wang et al. | 370/221 |
| 2009/0073921 A1* | 3/2009 | Ji et al. | 370/328 |
| 2009/0296704 A1* | 12/2009 | Kim et al. | 370/389 |

OTHER PUBLICATIONS

Huynh et al., "Metropolitan Ethernet Network: A move from LAN to MAN," Computer Networks, Elsevier Science Publishers B.V., Amsterdam, NL, vol. 51, No. 17, Oct. 3, 2007, pp. 4867-4894.

* cited by examiner

ACTIVE MULTI-PATH NETWORK REDUNDANCY WITH PERFORMANCE MONITORING

CROSS-REFERENCE TO RELATED APPLICATIONS

This application claims the benefit of U.S. Provisional Application No. 61/245,170 filed Sep. 23, 2009, and this application also claims the benefit of U.S. Provisional Application No. 61/319,363 filed Mar. 31, 2010, the disclosures of which are incorporated by reference herein for all purposes.

TECHNICAL FIELD

Embodiments pertain to redundant message processing, and more particularly to message layer processing of redundant messages originating from the same node of origin and with different IP addresses.

BACKGROUND

FIG. 1 is a tabular listing of the Open Systems Interconnection (OSI) Model. The OSI model may be represented as media layers having data units of bits, frames and packets, and as host layers having data and data segments. The layers may be further refined as physical, data link, network, transport, session, presentation, and application layers. User Datagram Protocol (UDP) is a communications protocol providing a limited service, i.e., a light weight protocol, for messages exchanged between computers in a network that uses the Internet Protocol (IP). UDP uses the IP to transport a data unit, i.e., a datagram, from one computer/node to another. Particularly, UDP does not provide for sequencing the arrival of the packets.

SUMMARY

Embodiments may include a node in an internetwork comprising: a processor and addressable memory wherein the processor is configured to: (a) read a sequence number and an originator identifier of a received packet having a message; (b) compare a stored highest sequence number associated with the originator identifier with the sequence number of the received packet; (c) if the sequence number of the received packet is less than or equal to the stored highest sequence number associated with the originator identifier, then discard the received packet; and (d) if the sequence number of the received packet is greater than the stored highest sequence number associated with the originator identifier, then deliver the message of the received packet to an application based on an upper layer protocol. The node may optionally be configured to receive packets having the same originator identifier from two or more paths. The originator may comprise a near real-time controller, and the node may comprise a gateway and at least one of: (1) an effector responsive to payload information of the received frames; (2) a radio frequency transmitter; (3) a radio frequency receiver; and (4) a sensor.

Also, for example, embodiments may be a method of redundant message processing comprising: (a) assigning, by a processor of an originator node: (i) a frame sequence number to a frame of a first packet; (ii) an originator identification number to the frame of the first packet; (iii) the frame sequence number to a frame of a second packet; and (iv) an originator identification number to the frame of the second packet; (b) recording, by a processor of a destination node: the frame sequence number and the originator number of a first received packet of a set comprising the first packet and the second packet; and (c) dropping, by the processor of the destination node: a second received packet having the recorded frame sequence number and the recorded originator number. Some embodiments of the method may further comprise, preceding the step of dropping: recording, by the processor of the destination node, a frame sequence number and an originator number of a second received packet having the recorded originator number of the first received packet, if a difference between the frame sequence number of the second received packet and the recorded frame sequence number of the first received packet is above an upper threshold or below a lower threshold value. Some embodiments of the method may further comprise, transmitting, by the originator node, the first packet via a first network interface circuit and the second packet via a second network interface circuit.

Method embodiments also include a method of network node health assessment comprising: (a) multicasting a health request to a plurality of network nodes of a network; (b) receiving a health request response message from at least one of the plurality of network nodes wherein the received health request response message comprises an Ethernet MAC address of the responding node; (c) associating a time stamp with the received health request response message; (d) storing the received Ethernet MAC address of the responding node and its associated time stamp; and (e) providing, to two or more network interface circuit (NIC) Ethernet drivers, identical outgoing messages to one or more nodes based on the received and stored Ethernet MAC addresses of the one or more nodes. The exemplary method embodiment may also include assessing network health based on one or more timestamps of the received and stored Ethernet MAC addresses of the one or more nodes. The exemplary method embodiment may also include comparing packets transmitted via two or more NIC paths with packets received via the two or more NIC paths; and determining a quantity of lost packets for each of the two or more the NIC paths.

BRIEF DESCRIPTION OF THE DRAWINGS

Embodiments are illustrated by way of example and not limitation in the figures of the accompanying drawings, and in which.

DETAILED DESCRIPTION

Figure 1:
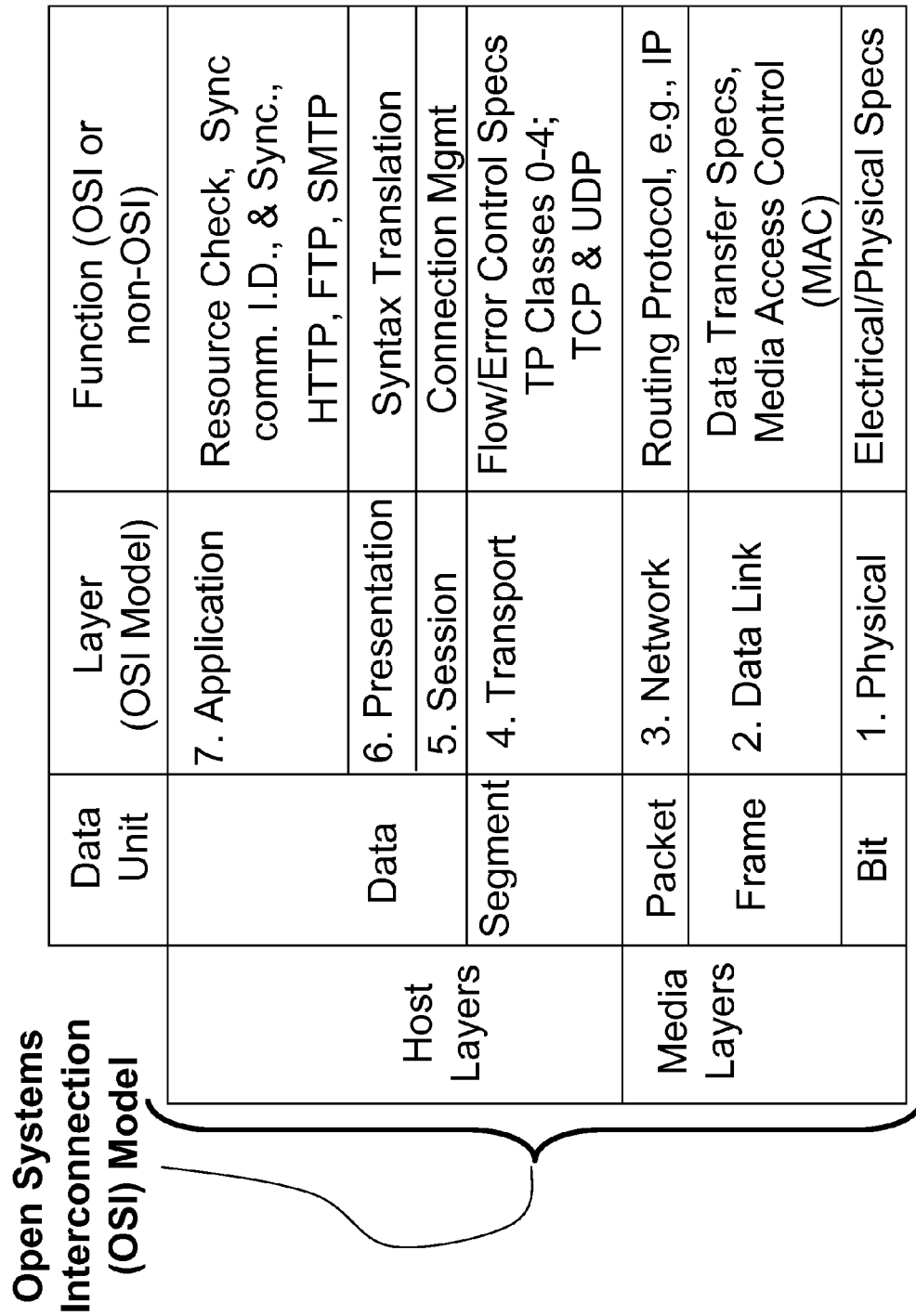
FIG. 1 is a tabular listing of the Open Systems Interconnection Model.
Figure 2:
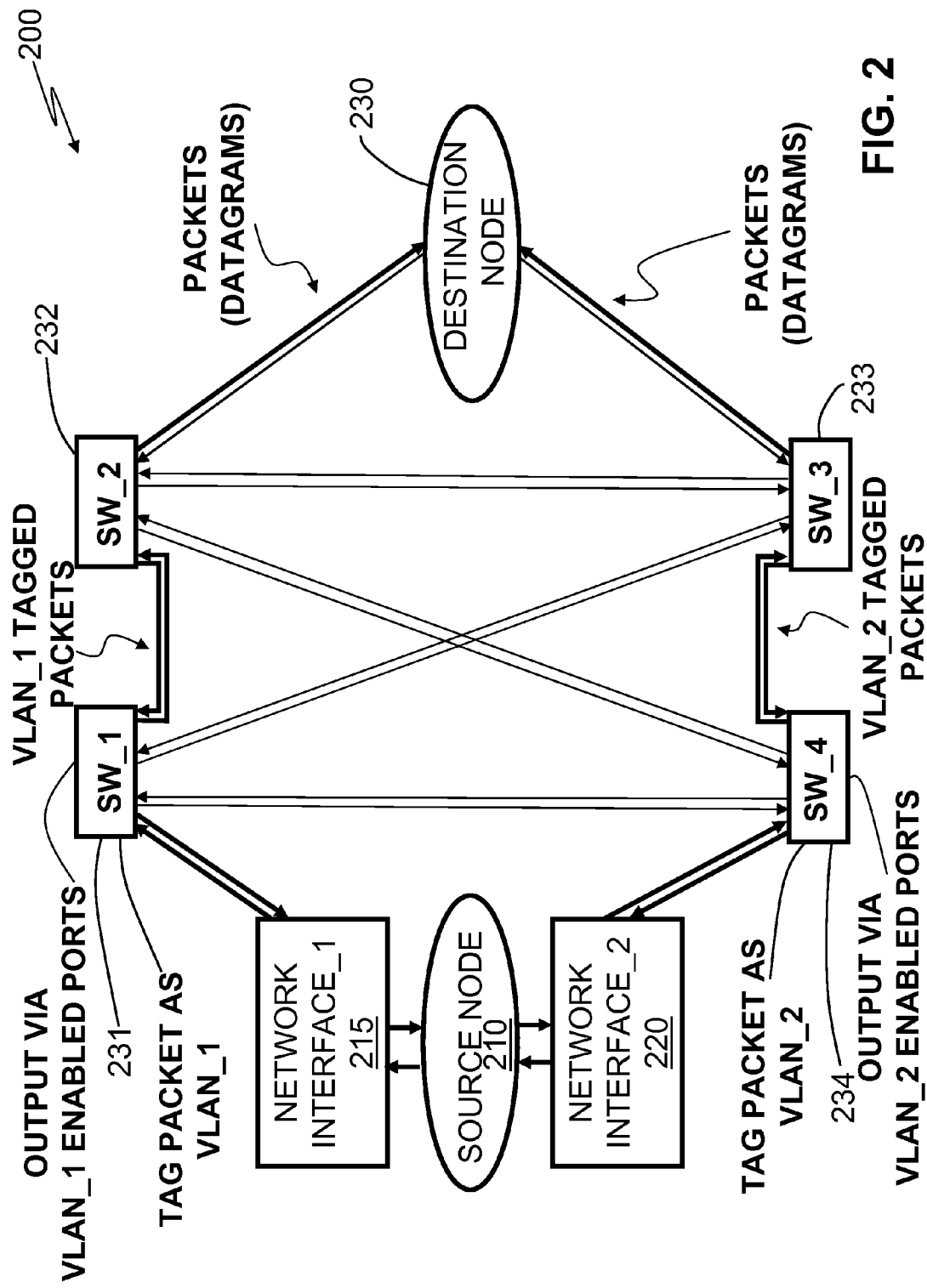
FIG. 2 is an exemplary top-level system diagram.

Reference is made to the drawings that illustrate exemplary embodiments. FIG. 2 is an exemplary top-level system diagram 200. A processor is defined herein as a computer or computing device, having a central processing unit (CPU)

and addressable memory, where a computing device may be configured by way of executable machine-readable instructions, circuitry, or combinations of both, to function as a special computing device. A network may comprise a source node comprising a processor, a destination node comprising a processor, and a network link interposed between the nodes. The source node may generate a message such as a command for a destination node. The exemplary message may be prepared and transmitted by a plurality of network interface cards. In the exemplary diagram of FIG. 2, the source node 210 interfaces with the network via two network interface devices 215, 220 or computer circuit boards that may be network interface cards (NICs). Each NIC may then connect to a routing switch 231-234, e.g., a switch having a table for directed port routing. In the exemplary network of FIG. 2, the first NIC may transmit to a first switch (SW_1) 231 and the first switch may transmit to a second switch (SW_2) 232. Also in the exemplary network of FIG. 2, the second NIC 220 may transmit the same messages as the first NIC 215 to a fourth switch (SW_4) 234 and the fourth switch 234 may transmit to a third switch (SW_3) 233. The second switch 232 and the third switch 233 may transmit packets/datagrams to the destination node 230. Accordingly, the destination node 230 may receive redundant messages from one source node 210 via two or more channels, for example.

Figure 3:
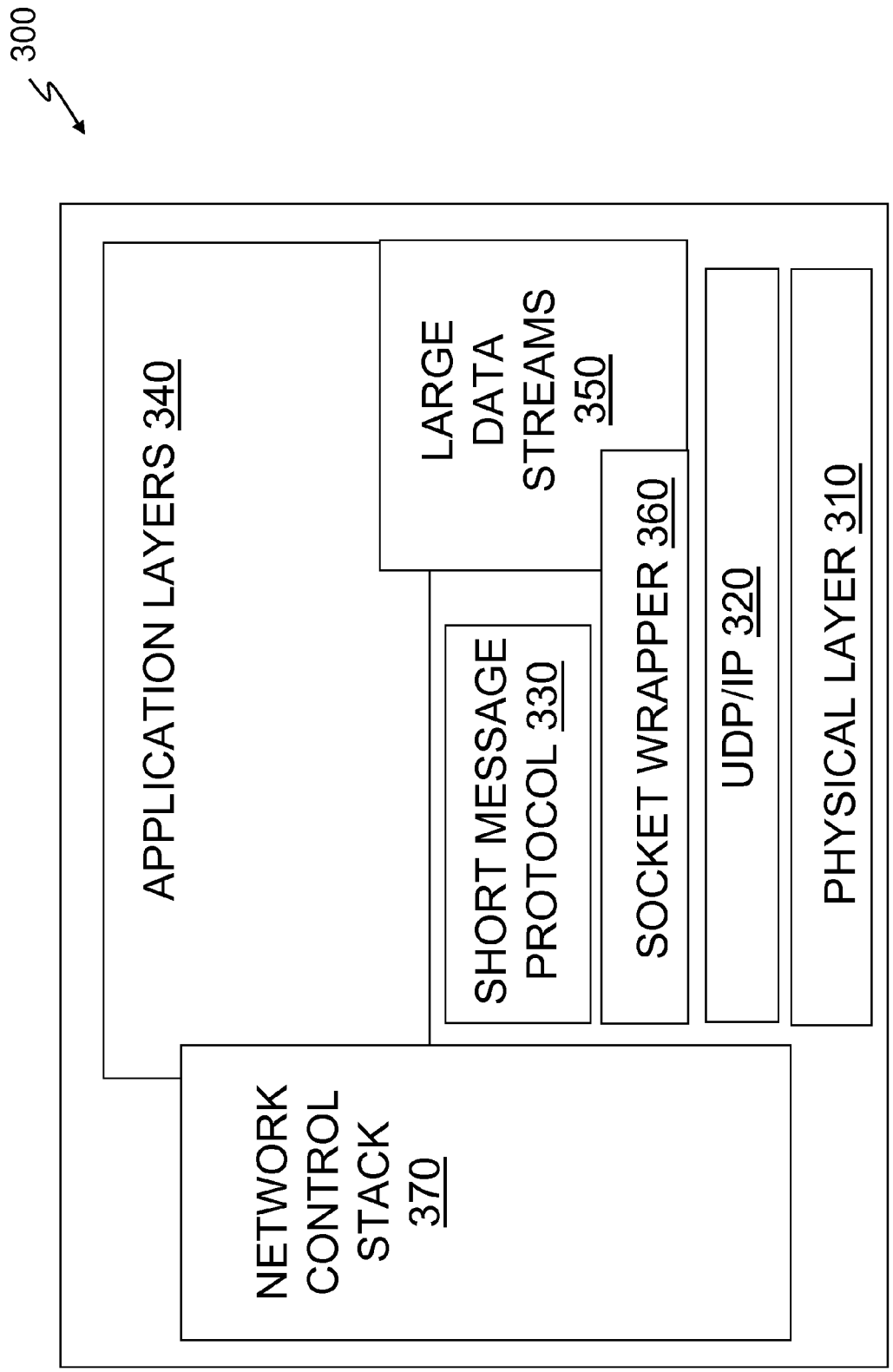
FIG. 3 depicts exemplary layers of an embodiment.
Figure 4:
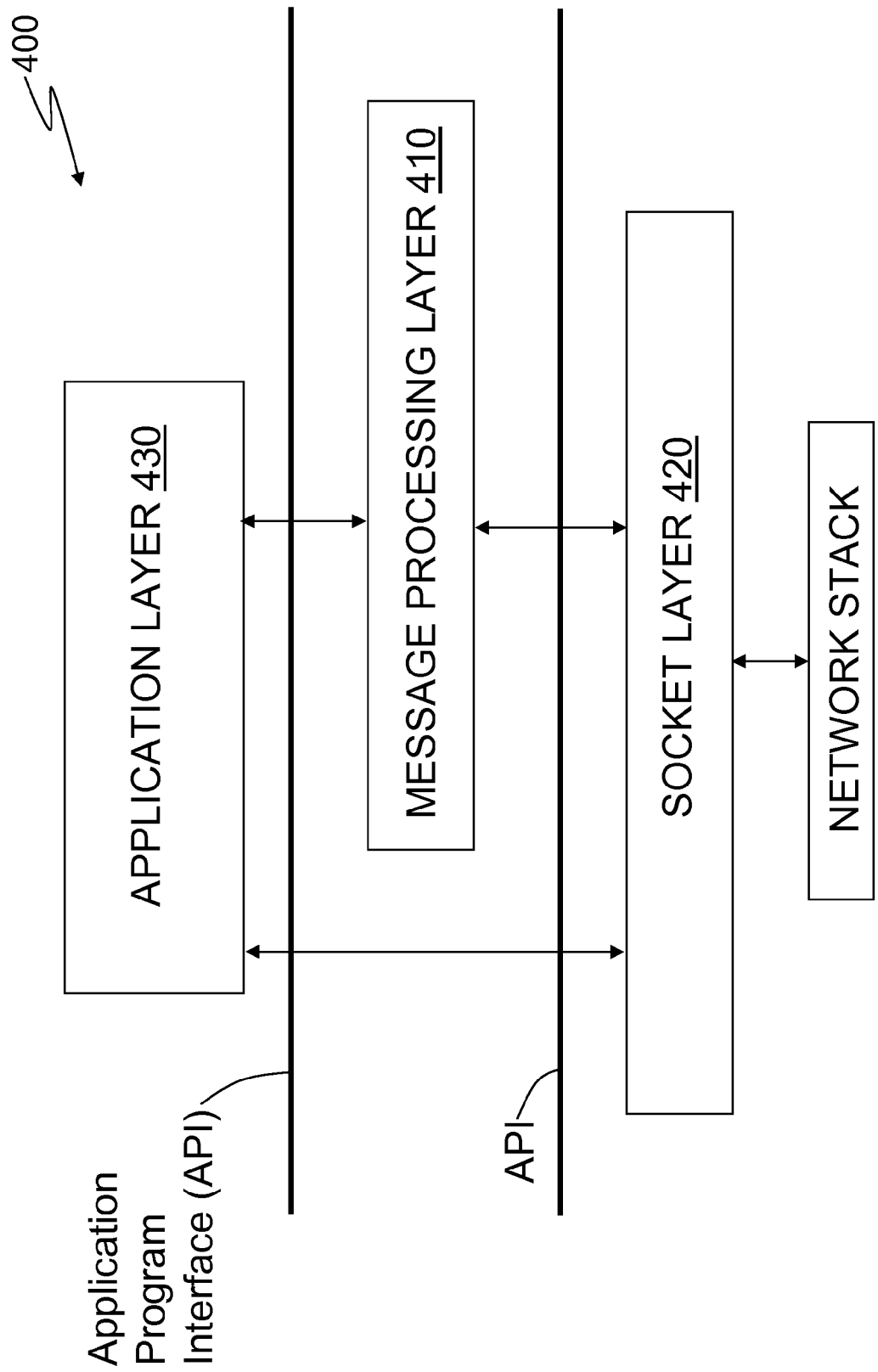
FIG. 4 depicts a top-level relational interface chart.
Figure 5:
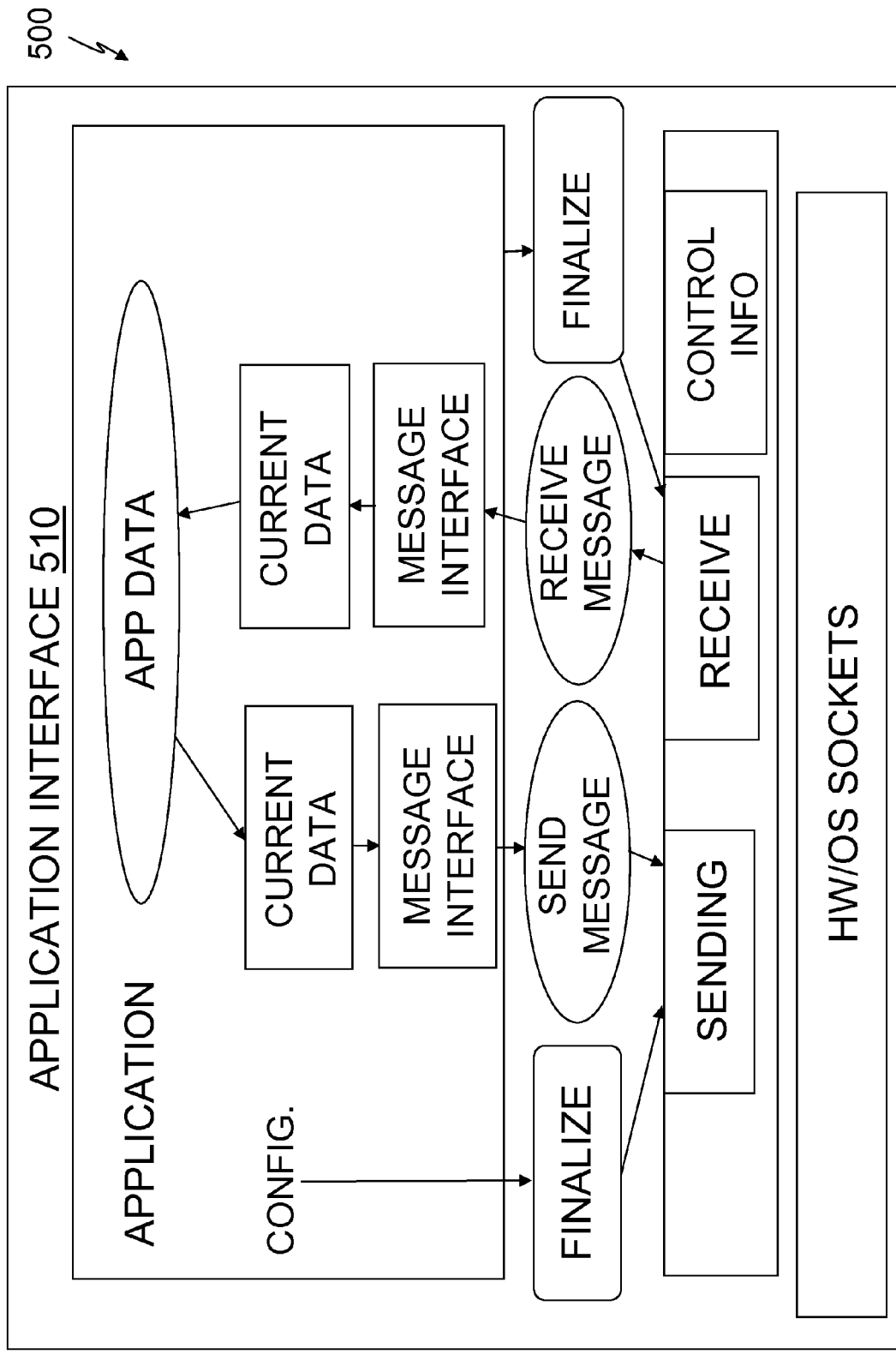
FIG. 5 depicts a relational interface chart.

FIG. 3 depicts exemplary layers 300 of an embodiment from the physical layer 310 to UDP/IP 320 to the short message protocol 330 and then the application layers 340. Also depicted in FIG. 3 are large data streams 350, a socket wrapper 360, and a network control stack 370. FIG. 4 is a top-level relational interface chart 400 depicting the message processing layer 410 interposed between the socket layer 420 and the application layer 430. The socket layer 420 for this example manages the opening and closing of sockets, handles the receiving and transmitting of UDP packets, and supports both unicast and multicast UDP datagrams. The message processing layer 410 for this example responds to ping messages, filters messages using the embedded sequence number, and, if operable with a real-time operating system (RTOS) node, may call the application layer 430 when a new message is available. FIG. 5 is a relational interface chart 500 showing an exemplary application interface 510. This figure illustrates an exemplary flow of messages to and from the application layer.

Figure 6:
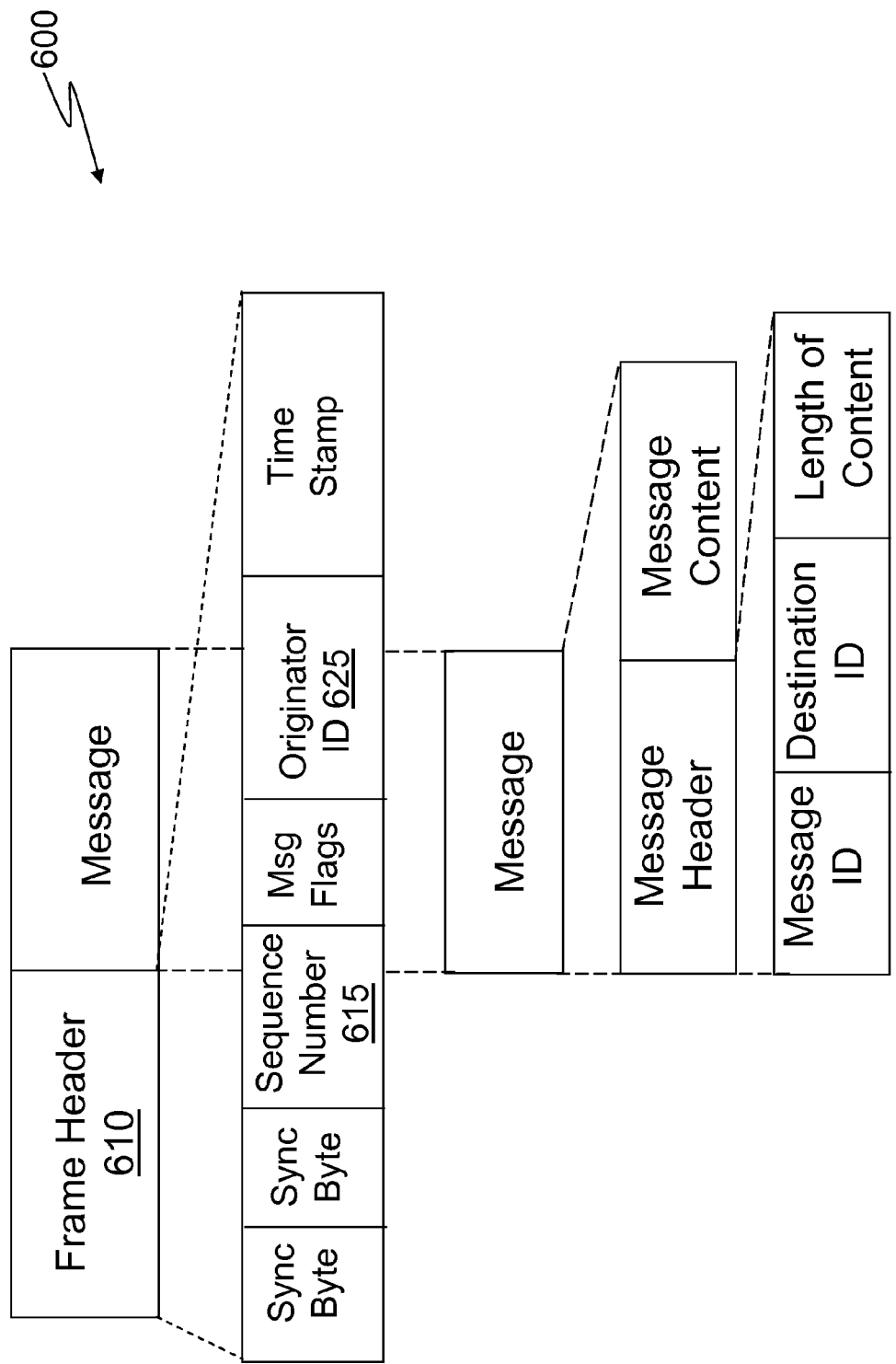
FIG. 6 illustrates an exemplary frame header content arrangement and message content arrangement.

FIG. 6 depicts an exemplary frame header content arrangement and message content arrangement 600. The frame header 610 is shown having a sequence number 615 and originator identification (ID) 625. To achieve continuity at the application level, the sequence number 615 may be referenced in conjunction with the originator ID 625. The sequence number 615 may be a 16-bit integer count of frames sent by a particular originator. Each originating node may have two or more NICs, each having a different IP address. The originator ID 625 may be an 8-bit integer uniquely identifying the node from which a frame originates. A node ID header file may be used to capture the list of node numbers.

Figure 7:
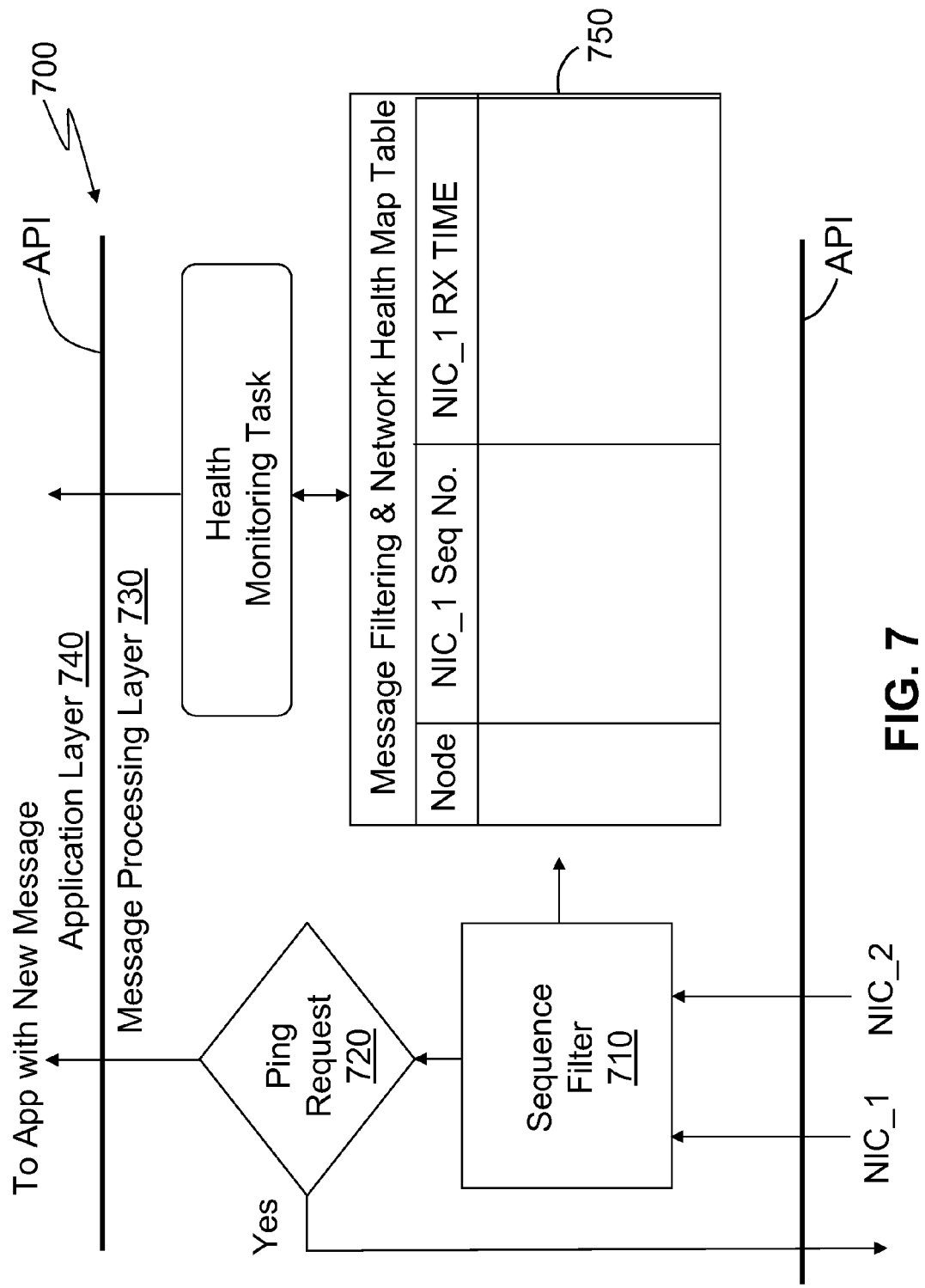
FIG. 7 is a top-level flowchart depicting exemplary sequence filtering and ping request handling.

FIG. 7 is a top-level flowchart 700 depicting an exemplary process of sequence filtering 710 and ping request handling 720. Two or more sources may provide messages in frames where the messages are identical and the sequence numbers are identical. The message processing layer 730 may store the last received sequence number and compare that number with the sequence number of a received frame. A network controller node may filter messages using the embedded sequence number, call the application layer 740 when a new message is available, determine network connectivity, and/or health, by sending out ping messages to all nodes, and process the respective responses. The network controller node may build a network connectivity map 750, or relational table, based on the response or lack of response from periodic ping messages, and provide a callback for the application layer 740 to acquire the connectivity information.

Figure 8:
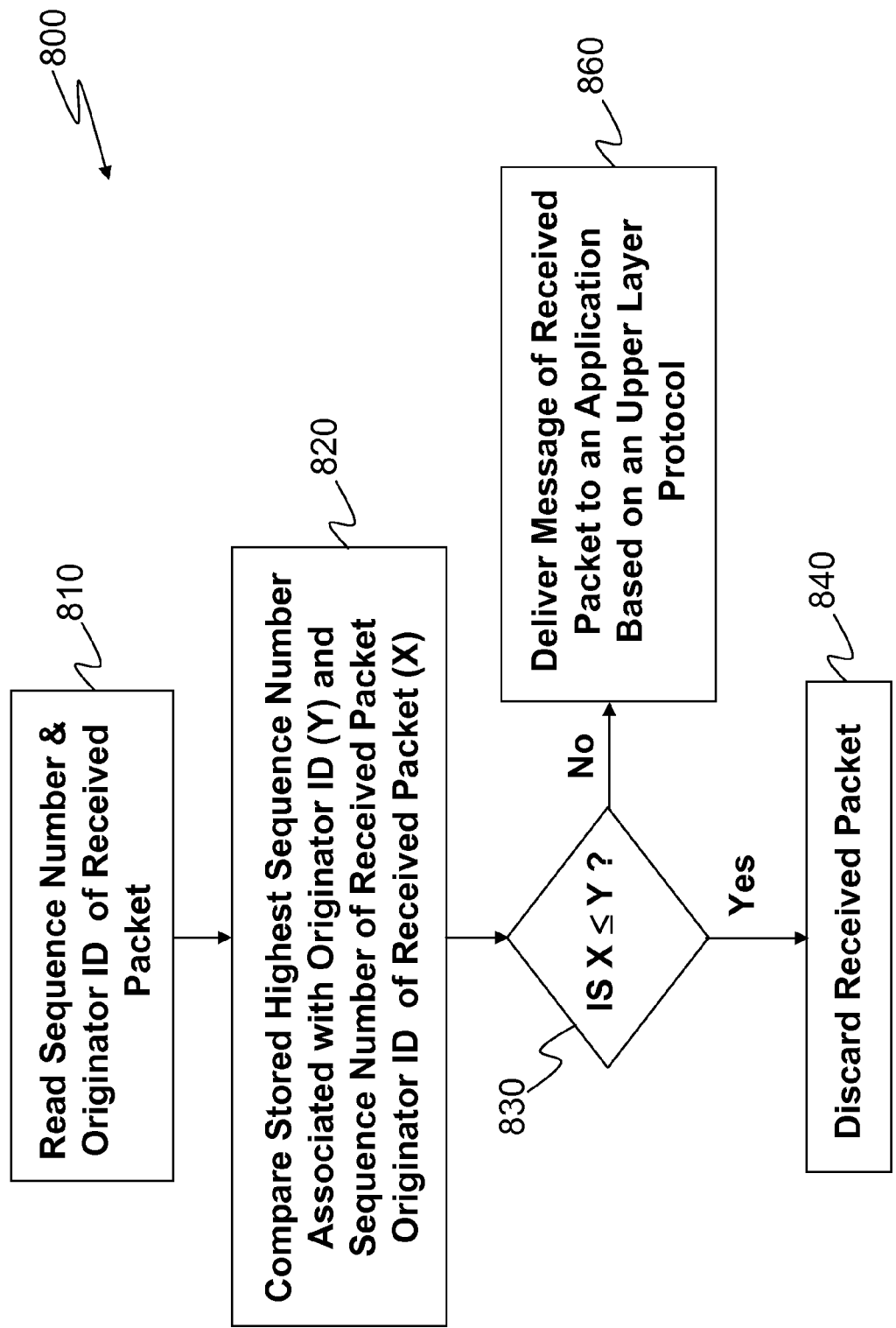
FIG. 8 is a flowchart depicting an exemplary sequence filtering embodiment.

FIG. 8 is a flowchart 800 depicting an exemplary sequence filtering embodiment of the present invention. An exemplary receiving embodiment, upon receiving and reading the packet (step 810), may compare the sequence number of a newly received packet with the previously, most recently received packet having the same originator ID 820. If the sequence number of the newly received packet is less than or equal to the already recorded number (test 830), then the newly received packet may be discarded (step 840). In some embodiments, the message processing layer of the receiving node may compare the magnitude of the difference between the sequence number of the already recorded number and the sequence number of the newly received packet. The receiver may then reset to the new sequence number, may record a sequence rollover event, and accordingly may retain the newly received packet for processing (step 860).

An exemplary embodiment may be in a system of an air vehicle having two or more flight control computers (FCCs) in an airborne network of the air vehicle. Each FCC has two network interface circuits or network interface cards (NICs) that accordingly provide two access points to the airborne network of the air vehicle. As described above, an exemplary architecture of the network as disclosed above is such that each NIC may provide a non-overlapping connection, via network segments, to each subsystem. That is, the path from a first NIC of a particular FCC to any particular subsystem has no physical layer network connections in common with the path from a second NIC of the particular FCC to that subsystem. The exemplary fault-tolerant network embodiment is based in part on the FCC being configured to generate redundant messages from each of its NICs. A network stack that may be used on the FCC may not support the directing of unicast traffic directly to a particular NIC. The stack in this embodiment operates according to a presumption that there is a single connection to any particular subnet, and accordingly routes the traffic automatically to an appropriate NIC. In particular, the Address Resolution Protocol (ARP) table maintained by the stack is not expecting two NICs on the same subnet, and consequently may preclude the network stack from sending redundant unicasts to the subsystems. One alternative embodiment may not use unicasts if the network stack determines that directing multicasts to a particular NIC is working as expected.

Exemplary embodiments include the sending of dual redundant Ethernet packets directly to the two NICs by using, for example, the VxWorks muxLib interface that works in combination with the normal VxWorks stack. The sending of dual redundant Ethernet packets directly to the two NICs generally avoids the unicast routing and ARP table lookup challenges encountered when attempting to send unicasts to a subnet for which there are two connections.

When an IP datagram is sent from a multihomed host, it may be passed to the interface with the best apparent route to the destination. Accordingly, the datagram may contain the source IP address of one interface in the multihomed host, yet be placed on the media by a different interface. The source media access control address on the frame is that of the interface that actually transmitted the frame to the media, and the source IP address is the one that the sending application sourced it from, not necessarily one of the IP addresses associated with the sending interface in the Network Connections UI. The so-called "weak end model" systems on which an address refers to a host—not an interface, is included in several operating systems including Microsoft™ Windows™. This "weak end model" means that when a packet arrives at one of the interfaces on a multihomed system, it will be picked up by the network stack so long as its destination address matches the address of one of the addresses. On the other hand, the so-called "strong end model" systems requires that the packet's destination address matches the underlying interface address to which it arrives. As for sending packets, weak end systems will send packets from an interface that does not match the source IP address of the packet, whereas strong end systems will not send packets from an interface that does not match the source IP address of the packet.

Figure 9:
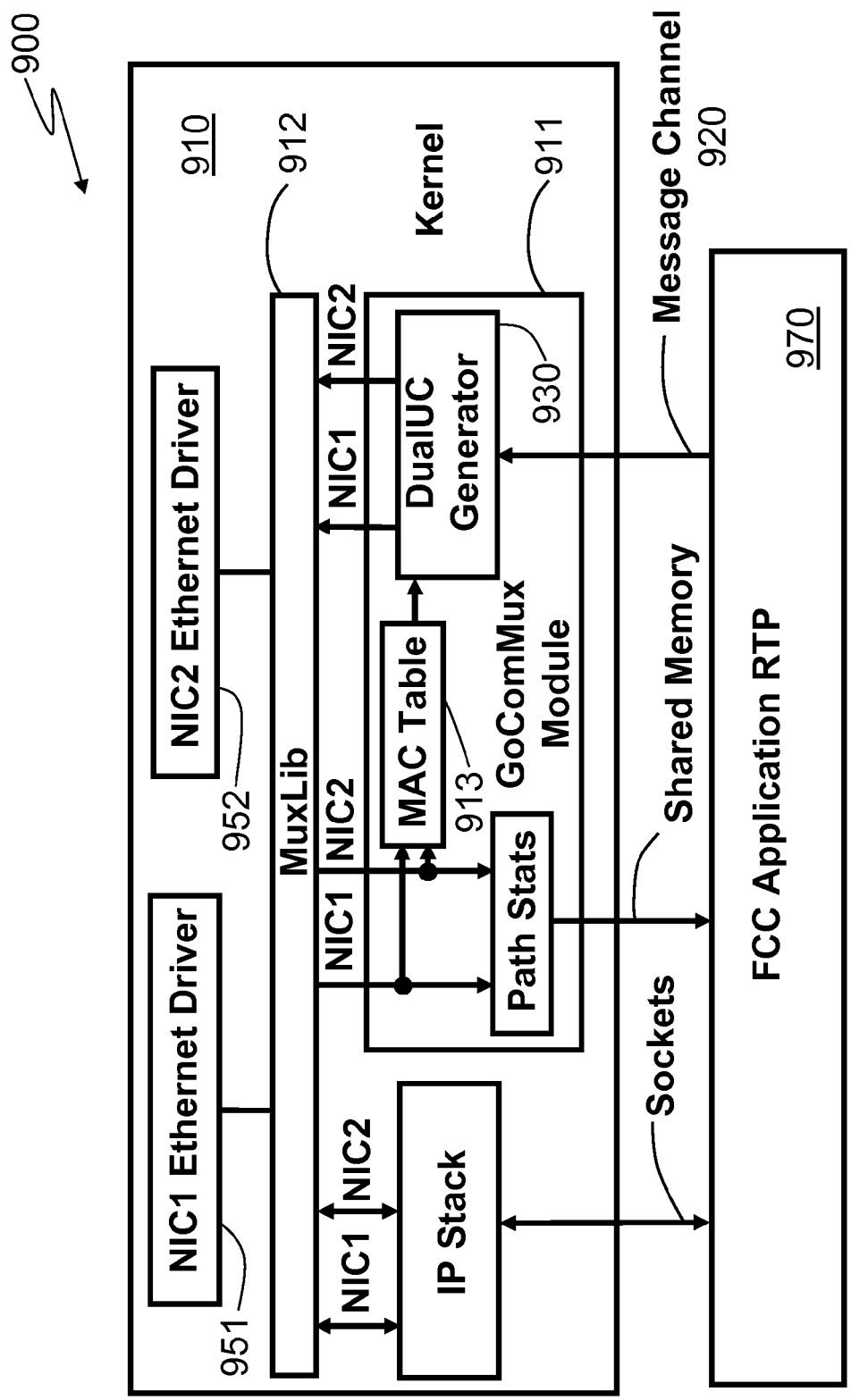
FIG. 9 is a functional block diagram depicting an exemplary Ethernet-based communication flow with data gathering for health assessment.

Generally as to the exemplary system architecture, reference is made to FIG. 9 where the FCC application 900 is divided between a kernel space 910 and a Real-Time process (RTP) 970. The kernel 910 handles the driver interfaces and the RTP 970 handles messaging and the flight control functions for airborne embodiments. As part of the payload of a standard IP UDP Ethernet frame, a layer termed a "goCom" layer 911 may be included to effect facilitating the following: (a) dropping redundant received messages based on duplicate sequence numbers in the goFrame header; and (b) gathering statistics on duplicate messages. The data gathered may be referenced and used to monitor the health of any and all redundant paths. In an exemplary embodiment VxWorks provides the muxLib interface 912 to provide access to Ethernet packets received on network interfaces. The muxLib is also used to send Ethernet messages out to a particular network interface.

When a packet is received, the application-installed callback may be executed in the context of the receive interrupt. A pointer to a buffer containing the received packet is provided by the mux interface. The packet may be inspected by a series of filters to establish that it is a valid "goCom" frame. If the message is from a subsystem on the network, e.g., an aircraft network of sensor, effector, and/or transceiver nodes, the Ethernet address of the subsystem may be stored in a table 913 indexed by the subsystems IP address. Accordingly, the table of indexed subsystem Ethernet addresses may be referenced to send unicast messages back to the subsystems corresponding to the stored addresses. The exemplary table may operate in place of an ARP—alone embodiment mechanism—in part because the ARP may not perform consistently in aircraft dual network path embodiments. Accordingly, it is noted that the FCC cannot send a message to any subsystem that has not yet already sent it a message—because it is by the indexed table that an FCC may access, or learn, the Ethernet MAC addresses of the subsystems. To populate the table proactively, an exemplary embodiment requests all nodes on the network respond to a multi-casted "health request." This health request may be selected from a typical or normal function of the system. That is, adjustments or modifications to available health requests are not necessary to support the dual unicast fault tolerant network design. Accordingly, when the subsystems respond to the health request with the health response message, the FCC immediately learns the Ethernet MAC addresses of every node on the network. The timestamp of when the packet was received from the subsystem is also stored in the table. This allows an assessment of the network health based on recent connectivity per path. Statistics are also gathered as to how many packets are lost on either path. The gathering of such statistics allows for sensitive detection of even single packet losses. The high level of sensitivity detection provides the potential for early detection and isolation of network issues.

A message channel interface from the RTP to the kernel may be used to communicate unicast messages to be sent redundantly from both NICs. An exemplary embodiment has the message channel with fixed-size buffers large enough to contain the largest supported Ethernet packet, or media transfer unit (MTU), that the system is expected to generate. An exemplary embodiment may have an MTU sized at 1536 bytes. The message channel 920 interface may be configured to be flexible and allows a wide range of unicast to be sent to any subsystem of the network. Metadata at the beginning of the message buffer may be referenced to identify the IP address and port to which the message is intended to be sent.

When the kernel 910 receives a message from the RTP 970 to be sent to a particular subsystem, it may first check to determine whether a valid Ethernet address for the subsystem is stored in the Ethernet table 913. If not, the message may be silently discarded, i.e., discarded without notice to other elements of the network and the FCC Application RTP. If an Ethernet address is available for the subsystem, two packets are formed 930 based on the message 920. The two messages are identical except for the NIC from which they originate. In particular, the same sequence number is used for both packets. The packets are then sent to the two NICs, particularly their respective NIC Ethernet driver 951, 952, for transmission via the muxLib interface 912.

The kernel 910 embodied as a VxWorks kernel may be built with a shared data library support, e.g., sdLib support, to provide an efficient mechanism to pass the statistics from the packet receive handler to the RTP code that generates the goCom message with the network statistics. Embodiments of the kernel have the muxLib as the standard interface used by the network stack.

Non-volatile storage, for example flash memory or NVRAM, may be used to store the Hobbs time, i.e., elapsed time, used to time stamp received Ethernet packets. Although relatively fast, the NVRAM accesses are slower than RAM access and read performance is a consideration since every received packet is time stamped. The NVRAM may be an 8 bit access device as opposed to the RAM which may be a 32 bit access device. The 8 bit access makes a data coherency determination across the 4 bytes of the seconds counter tedious whereas the 32 bit access is inherently atomic. Accordingly, the Hobbs seconds counter is stored in RAM as well as in NVRAM, and may be updated in both locations as part of a one-second interrupt processing.

A standard RAM map such as the VxWorks standard RAM map may be used where the boot loader uses high memory while loading the application to low memory. When launched, the application uses high memory starting at SYSMEMTOP to build the stack. The stack builds down. Any fixed memory allocations not managed by the OS or compiler may be located above SYSMEMTOP. The kernel application uses the sdLib to create a named shared data area that is managed by the kernel. The named area may then be opened by the RTP application so that the Ethernet packet statistics may be read.

A Curtis Wright BSP for VxWorks may be used to provide the Ethernet driver. Accordingly, the muxLib Ethernet driver interface may be configured to operate in MUX_PROTO_SNARF mode. This configuration allows all receive packets to be promiscuously inspected. The packets are then optionally returned to the muxLib to be sent to the standard network stack for normal processing.

Figure 10:
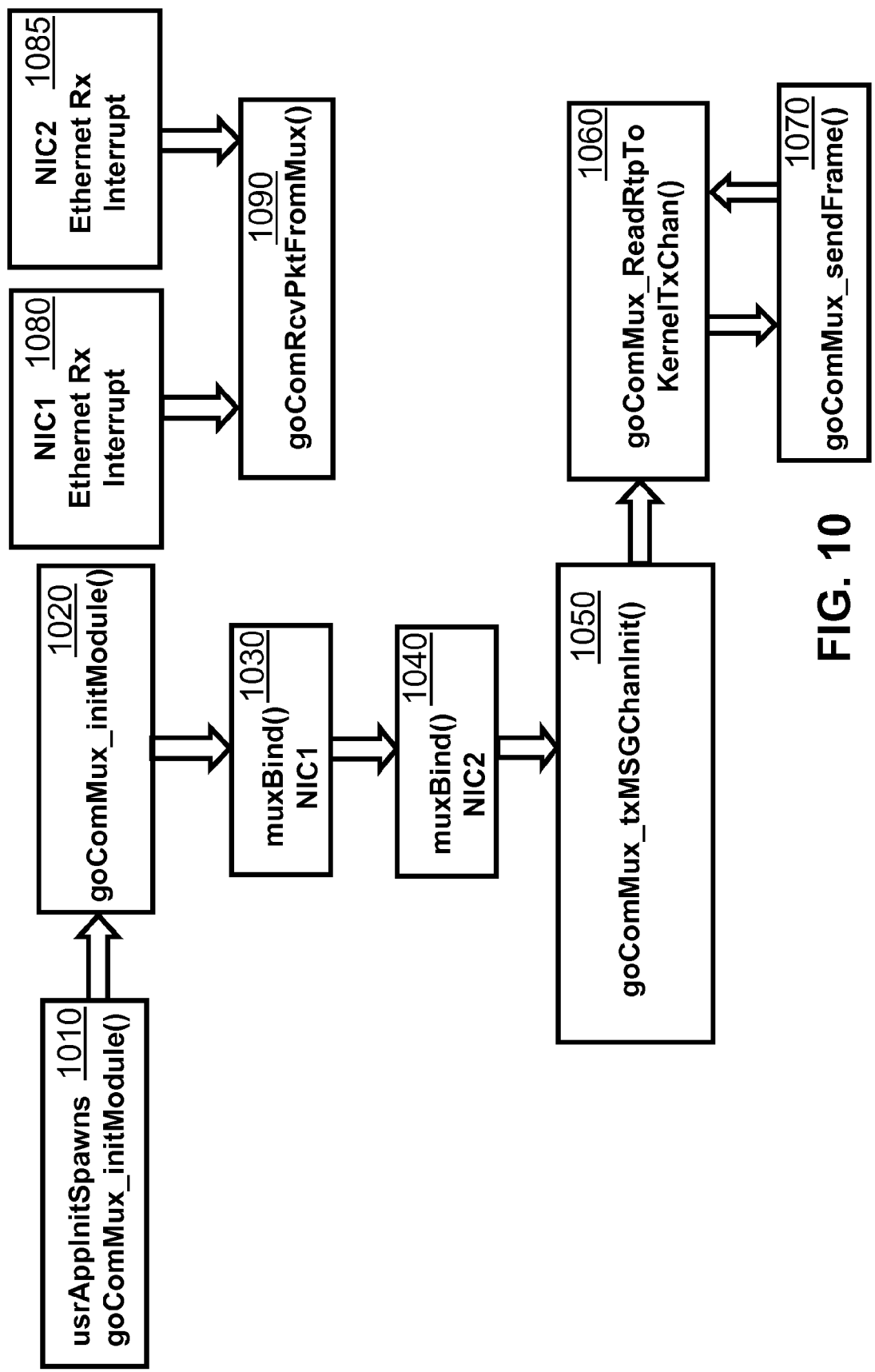
FIG. 10 depicts an exemplary algorithmic structure as a GoComMux Flow Diagram.

An exemplary algorithmic structure is depicted by the GoComMux Flow Diagram of FIG. 10. An application layer may initialize or spawn a procedure for the goComMux Module 1010. Once the module is initialized 1020, the goComMux module may then bind a first NIC 1030 and bind a second NIC 1040—so as to be able to determine the NIC from which it originated. A procedure to initialize transmitting the messages 1050 may be executed where the kernel may handle the driver interfaces and read the RTP messages 1060—e.g., packets/datagrams—to the kernel transmit channel. The GoComMux module may be able to send frames 1070 to the FCC Application RTP 970. The GoComMux module may accept interrupts for the first NIC 1080 and second NIC 1085 and call a procedure 1090 to receive the packets from the MuxLib.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A node in an internetwork comprising:
    a processor and addressable memory wherein the processor is configured to:
    read a sequence number and an originator identifier of a received packet of a sent dual redundant packet by an originator having a message from the originator;
    compare a stored highest sequence number associated with the originator identifier with the sequence number of the received packet;
    if the sequence number of the received packet is less than or equal to the stored highest sequence number associated with the originator identifier, then discard the received packet; and
    if the sequence number of the received packet is greater than the stored highest sequence number associated with the originator identifier, then deliver the message of the received packet to an application based on an upper layer protocol;
    wherein the originator comprises a near real-time controller and the node comprises a gateway and an aircraft effector responsive to payload information of the received frames.

2. The node of claim 1 wherein the node is further configured to receive packets having the same originator identifier from two or more paths.

3. The node of claim 1 wherein the node further comprises a radio frequency transmitter.

4. The node of claim 1 wherein the node further comprises a radio frequency receiver.

5. The node of claim 1 wherein the node further comprises a sensor.

6. A method of redundant message processing comprising:
    assigning, by a processor of an originator node:
    a frame sequence number to a frame of a first packet of a dual redundant set;
    an originator identification number to the frame of the first packet of the dual redundant set;
    the frame sequence number to a frame of a second packet of the dual redundant set; and
    an originator identification number to the frame of the second packet of the dual redundant set;
    recording, by a processor of a destination node:
    the frame sequence number and the originator number of a first received packet of a the dual redundant set comprising the first packet and the second packet; and
    dropping, by the processor of the destination node:
    a second received packet of the dual redundant set having the recorded frame sequence number and the recorded originator number;
    wherein the originator node comprises a near real-time controller and the destination node comprises a gateway and an aircraft effector responsive to payload information of the received frames.

7. The method of claim 6 further comprising, preceding the step of dropping:
    recording, by the processor of the destination node:
    a frame sequence number and an originator number of the second received packet of the dual redundant set having the recorded originator number of the first received packet, if a difference between the frame sequence number of the second received packet and the recorded frame sequence number of the first received packet is above an upper threshold or below a lower threshold value.

8. The method of claim 6 further comprising:
    transmitting, by the originator node, the first packet of the dual redundant set via a first network interface circuit and the second packet of the dual redundant set via a second network interface circuit.

9. A method of network node health assessment comprising:
    multicasting or broadcasting a health request to a plurality of network nodes of a network;
    receiving a health request response message from at least one of the plurality of network nodes wherein the received health request response message comprises an Ethernet MAC address of the responding node;
    associating a time stamp with the received health request response message;
    storing the received Ethernet MAC address of the responding node and its associated time stamp; and
    providing, to two or more network interface circuit (NIC) Ethernet drivers in communication with an originator node, identical outgoing messages from the originator node to one or more nodes based on the received and stored Ethernet MAC addresses of the one or more nodes;
    wherein the originator node comprises a near real-time controller and the responding node comprises a gateway and an aircraft effector responsive to payload information of the received frames.

10. The method of claim 9 further comprising:
    assessing network health based on one or more timestamps of the received and stored Ethernet MAC addresses of the one or more nodes.

11. The method of claim 9 further comprising:
    comparing packets transmitted via two or more NIC paths with packets received via the two or more NIC paths; and
    determining a quantity of lost packets for each of the two to more NIC paths.

\* \* \* \* \*